US012659661B2

(12) United States Patent (10) Patent No.: US 12,659,661 B2
Kawai et al. (45) Date of Patent: Jun. 16, 2026

(54) SOUND CONVERSION DEVICE

(71) Applicant: DENSO CORPORATION, Kariya-city (JP)

(72) Inventors: Tetsuto Kawai, Kariya-city (JP); Kazuaki Mawatari, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 182 days.

(21) Appl. No.: 18/761,633

(22) Filed: Jul. 2, 2024

(65) Prior Publication Data

US 2024/0357287 A1     Oct. 24, 2024

Related U.S. Application Data

(63) Continuation of application No. PCT/JP2022/044034, filed on Nov. 29, 2022.

(30) Foreign Application Priority Data

Jan. 7, 2022    (JP) ................................. 2022-001718

(51) Int. Cl.
H04R 3/04          (2006.01)
G01M 99/00          (2011.01)

(52) U.S. Cl.
CPC ............ H04R 3/04 (2013.01); G01M 99/005 (2013.01); H04R 2430/01 (2013.01)

(58) Field of Classification Search
CPC .... H04R 3/04; H04R 2430/01; G01M 99/005
See application file for complete search history.

(56) References Cited

U.S. PATENT DOCUMENTS

| | | | | | |
|---|---|---|---|---|---|
| 4,792,145 | A | * | 12/1988 | Eisenberg ................ | A61B 7/04 |
| | | | | | 600/528 |
| 5,898,363 | A | * | 4/1999 | Altilio ...................... | G08B 3/10 |
| | | | | | 340/384.1 |
| 2012/0148066 | A1* | | 6/2012 | Honji ..................... | G10K 15/04 |
| | | | | | 381/86 |

(Continued)

FOREIGN PATENT DOCUMENTS

| | | | | | |
|---|---|---|---|---|---|
| JP | 59060321 | A | * | 4/1984 | ............... G10H 1/00 |
| JP | S5960321 | A | | 4/1984 | |

(Continued)

*Primary Examiner* — Oyesola C Ojo
(74) *Attorney, Agent, or Firm* — Nixon & Vanderhye P.C.

(57) ABSTRACT

A sound conversion device includes a sound acquisition circuit that acquires the operation sound including abnormal sound as a sound pressure time signal that is a signal indicating a change in sound pressure intensity over time, a signal conversion circuit that converts a signal corresponding to the sound pressure time signal into a frequency characteristic indicating an intensity of sound pressure for each frequency including a human inaudible frequency band, obtains audible signal in which the frequency of the abnormal sound signal indicating the intensity of the sound pressure of the abnormal sound in the inaudible frequency band is changed to a human audible frequency band in the signal corresponding to the frequency characteristic, and output the audible signal as an audible sound signal that is a signal indicating a change in sound pressure intensity over time, and a speaker that generates sound based on the audible sound signal.

14 Claims, 8 Drawing Sheets

(56)                    References Cited

U.S. PATENT DOCUMENTS

| | | | | |
|---|---|---|---|---|
| 2019/0333367 A1 * | 10/2019 | Shimizu | ............. | G06F 3/017 |
| 2021/0311424 A1 * | 10/2021 | Mori | ............. | G03G 15/55 |
| 2024/0357287 A1 * | 10/2024 | Kawai | ............. | H04R 29/001 |

FOREIGN PATENT DOCUMENTS

| | | | | | |
|---|---|---|---|---|---|
| JP | 7-55550 | A | 3/1995 | | |
| JP | 2018179863 | A | * 11/2018 | ............. | G01H 17/00 |
| JP | 2020173229 | A | 10/2020 | | |
| JP | 2021151814 | A | 9/2021 | | |

* cited by examiner

FIG. 9

SOUND CONVERSION DEVICE

CROSS REFERENCE TO RELATED APPLICATIONS

This application is a continuation application of International Patent Application No. PCT/JP2022/044034 filed on Nov. 29, 2022, which designated the U.S. and based on and claims the benefits of priority of Japanese Patent Application No. 2022-001718 filed on Jan. 7, 2022. The entire disclosure of all of the above applications is incorporated herein by reference.

TECHNICAL FIELD

The present disclosure relates to a sound conversion device.

BACKGROUND

Conventionally, there has been disclosed a diagnostic device for a rotating equipment that detects an acoustic signal in a human inaudible frequency band and determines whether or not there is an abnormality in the rotating equipment based on the detected acoustic signal.

SUMMARY

An object of the present disclosure is to provide a sound conversion device that converts a sound in an inaudible frequency band to a sound audible to humans and outputs the sound.

According to one aspect of the present disclosure, a sound conversion device for converting an operation sound generated when a target equipment operates includes:

a sound acquisition circuit configured to acquire the operation sound including abnormal sound as a sound pressure time signal that is a signal indicating a change in sound pressure intensity over time, a signal conversion circuit configured to convert a signal corresponding to the sound pressure time signal into a frequency characteristic indicating an intensity of sound pressure for each frequency including a human inaudible frequency band, obtain audible signal in which the frequency of the abnormal sound signal indicating the intensity of the sound pressure of the abnormal sound in the inaudible frequency band is changed to a human audible frequency band in the signal corresponding to the frequency characteristic, and output the audible signal as an audible sound signal that is a signal indicating a change in sound pressure intensity over time, and a speaker configured to generate sound based on the audible sound signal.

BRIEF DESCRIPTION OF DRAWINGS

FIG. 9 is a diagram illustrating an example of frequency characteristics determined by a DSP unit according to another embodiment.

DETAILED DESCRIPTION

Figure 1:
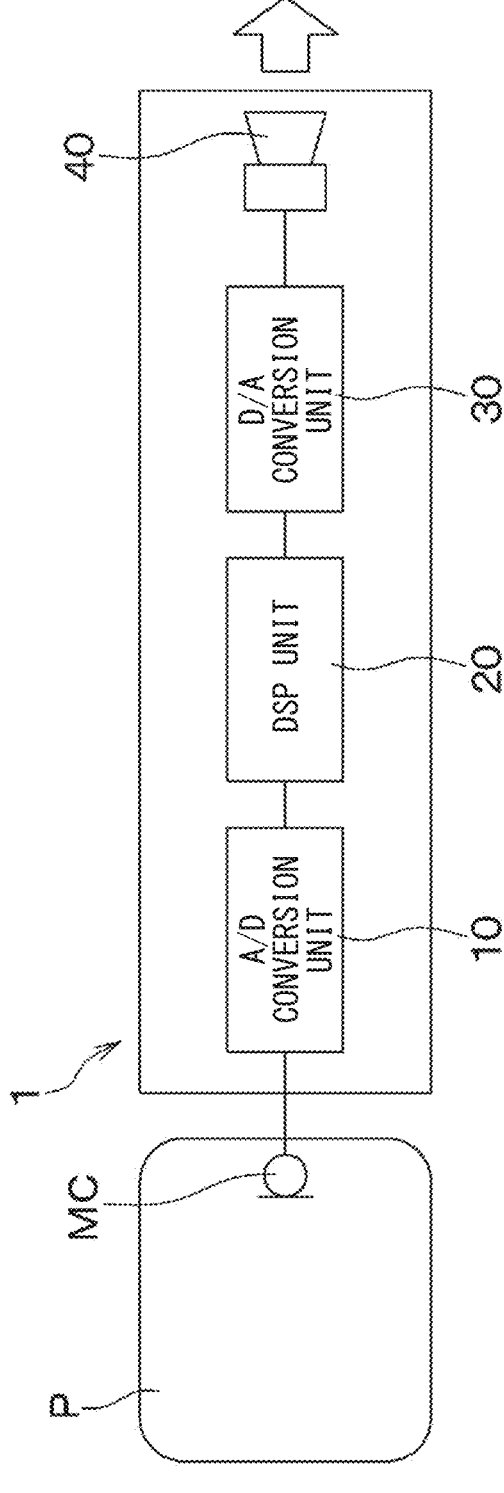
FIG. 1 is a schematic configuration diagram of a sound conversion device according to a present embodiment.

In an assumable example, there has been disclosed a diagnostic device for a rotating equipment that detects an acoustic signal in a human inaudible frequency band and determines whether or not there is an abnormality in the rotating equipment based on the detected acoustic signal. This diagnostic device for the rotating equipment determines whether there is an abnormality in the rotating equipment based on a peak value of the signal obtained by Fourier transformation, after performing a signal processing such as filter processing on a detected acoustic signal in an inaudible frequency band.

By the way, when the equipment to be inspected, such as rotating equipment, is in an abnormal state, when a person performs repair work on the equipment that is in an abnormal state, it is necessary to listen to abnormal sounds generated by the equipment. However, according to the intensive studies by the inventors, although the diagnostic device can determine abnormality of the target equipment, it was discovered that it was not possible to make people hear the abnormal sounds generated by the target equipment. An object of the present disclosure is to provide a sound conversion device that converts a sound in an inaudible frequency band to a sound audible to humans and outputs the sound.

According to one aspect of the present disclosure, a sound conversion device for converting an operation sound generated when a target equipment operates includes:

a sound acquisition circuit configured to acquire the operation sound including abnormal sound as a sound pressure time signal that is a signal indicating a change in sound pressure intensity over time, a signal conversion circuit configured to convert a signal corresponding to the sound pressure time signal into a frequency characteristic indicating an intensity of sound pressure for each frequency including a human inaudible frequency band, obtain audible signal in which the frequency of the abnormal sound signal indicating the intensity of the sound pressure of the abnormal sound in the inaudible frequency band is changed to a human audible frequency band in the signal corresponding to the frequency characteristic, and output the audible signal as an audible sound signal that is a signal indicating a change in sound pressure intensity over time, and a speaker configured to generate sound based on the audible sound signal.

According to this configuration, even if the operation sound of the target equipment includes an abnormal sound at a frequency that is inaudible to humans, the sound conversion device converts the frequency of the abnormal sound into a human audible frequency and generates it, so that the abnormal sound can be heard by a person.

An embodiment of the present disclosure will be described based on FIGS. 1 to 8. When an operation sound of a target equipment P to be inspected includes an abnormal sound, a sound conversion device 1 of the present embodiment is a device that converts a frequency of the abnormal sound and outputs an abnormal sound whose frequency has been converted. The target equipment P is, for example, production equipment installed in a factory. Further, abnormal sound is a sound generated when the target equipment P operates in an abnormal state other than a normal state.

As shown in FIG. 1, the sound conversion device 1 includes an A/D conversion unit 10, a DSP unit 20, a D/A conversion unit 30, and a speaker 40. The sound conversion device 1 acquires information regarding the operation sound of the target equipment P from a microphone MC provided outside the sound conversion device 1.

The microphone MC is a sound detection unit that detects the operation sound of the target equipment P to be inspected and outputs a signal corresponding to the detected operation sound to an outside as a sound pressure signal. The microphone MC is installed inside the target equipment P, and transmits a sound pressure signal corresponding to the operation sound of the target equipment P as an analog signal to the A/D conversion unit 10 at predetermined intervals, for example. The microphone MC may be installed outside the target equipment P as long as it can collect the operation sound of the target equipment P.

The A/D conversion unit 10 is a sound acquisition unit that receives a sound pressure signal corresponding to the operation sound transmitted from the microphone MC. The A/D conversion unit 10 includes a microcomputer including a CPU and a storage medium such as ROM and RAM, an input circuit, an output circuit, and peripheral circuits thereof. The A/D conversion unit 10 samples the analog signal transmitted from the microphone MC at predetermined sampling intervals, and converts the analog signal into a digital signal. The A/D conversion unit 10 then acquires the operation sound generated when the target equipment P operates as a sound pressure time signal that is a time signal indicating a change in sound pressure intensity over time. The sound pressure time signal includes information on changes in sound pressure intensity over time. The A/D conversion unit 10 outputs the acquired sound pressure time signal to the DSP unit 20. In the present embodiment, the A/D conversion unit 10 functions as a sound acquisition circuit.

The DSP unit 20 includes a microcomputer including a CPU and a storage medium such as ROM and RAM, an input circuit, an output circuit, and peripheral circuits thereof. The storage medium includes a RAM, a ROM, a writable nonvolatile storage medium, and the like.

Further, the storage medium stores in advance a program for the DSP unit 20 to execute signal processing, which will be described later, and information, which will be described later, regarding abnormal sounds from the target equipment P. When the sound pressure time signal converted into a digital signal from the A/D conversion unit 10 is sent to the input circuit, the DSP unit 20 executes signal processing according to the program stored in the storage medium and transmits a digital signal related to the sound pressure signal after signal processing from the output circuit to the D/A conversion unit 30. The DSP unit 20 uses the RAM of the storage medium as a work area when executing a program stored in the ROM of the storage medium or a writable nonvolatile storage medium.

The D/A conversion unit 30 is a signal output unit that converts the digital signal input from the DSP unit 20 into an analog signal and outputs the analog signal. The D/A conversion unit 30 includes a microcomputer including a CPU and a storage medium such as ROM and RAM, an input circuit, an output circuit, and peripheral circuits thereof. The D/A conversion unit 30 outputs a signal corresponding to the sound pressure signal converted into an analog signal to the speaker 40. The RAM, ROM, and writable nonvolatile storage medium in each of the A/D conversion unit 10, the DSP unit 20, and the D/A conversion unit 30 are non-transitional physical storage medium.

The speaker 40 is a sound generator that outputs a sound related to abnormal sound of the target equipment P based on a signal input from the D/A conversion unit 30. The speaker 40 is installed, for example, around the target equipment P, and generates a sound related to the abnormal sound of the target equipment to a worker who is near the target equipment P.

Hereinafter, the operation of the sound conversion device 1 having the above configuration will be explained with reference to FIGS. 2 to 5. When the A/D conversion unit 10 receives a signal corresponding to the operation sound of the target equipment P from the microphone MC, the A/D conversion unit 10 converts the operation sound generated when the target equipment P operates as a sound pressure time signal. and outputs the sound pressure time signal to the DSP unit 20.

Figure 2:
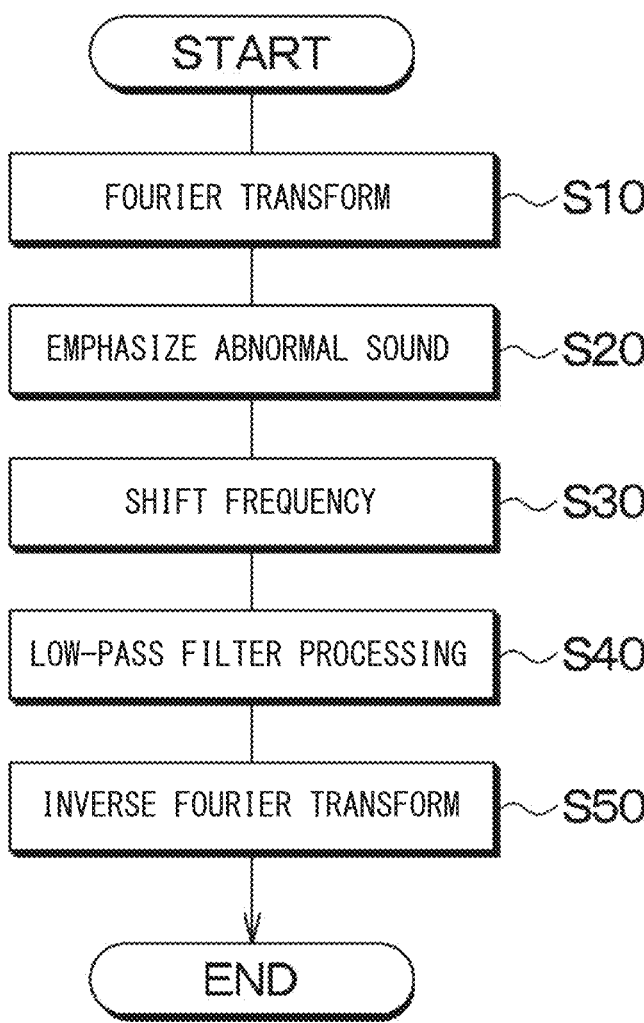
FIG. 2 is a diagram illustrating an example of a processing executed by a DSP unit according to the present embodiment.

When the DSP unit 20 receives the sound pressure time signal from the A/D conversion unit 10, it executes the processing shown in FIG. 2 by reading and executing a predetermined program from the storage medium.

Specifically, when the DSP unit 20 receives the sound pressure time signal from the A/D conversion unit 10, first in step S10, the DSP unit 20 performs a Fourier transform on the received sound pressure time signal, and converts the sound pressure time signal for each frequency. into a signal indicating the intensity of the sound pressure. For example, the DSP unit 20 extracts only a predetermined length of time from the input sound pressure time signal and performs short-time Fourier transform to convert into a signal indicating the intensity of sound pressure at each frequency. Hereinafter, the signal obtained by subjecting the sound pressure time signal received from the A/D conversion unit 10 to short-time Fourier transform will also be referred to as a Fourier-transformed signal.

The DSP unit 20 of the present embodiment obtains a Fourier-transformed signal by converting the sound pressure time signal received from the A/D conversion unit 10 into sound pressure intensities for each frequency in a frequency band including a frequency band audible to ordinary people and a band of frequencies inaudible to humans. For example, an audible frequency band for a typical person is from 20 Hz to 15,000 Hz, and the frequency band greater than 15,000 Hz is defined as an inaudible frequency band.

In this case, the DSP unit 20 converts the sound pressure time signal received from the A/D conversion unit 10 into sound pressure intensity for each frequency in the frequency band from 20 Hz to a predetermined maximum frequency, including both audible and inaudible frequency bands. The maximum convertible frequency determined by the DSP unit 20 is set to, for example, 50,000 Hz, which is an inaudible frequency. The maximum frequency that can be converted by the DSP unit 20 is not limited to 50,000 Hz, and may be set to a frequency greater than 50,000 Hz (for example, 100,000 Hz) or may be set to a frequency smaller than 50,000 Hz (for example, 30,000 Hz).

Subsequently, in step S20, the DSP unit 20 obtains a frequency characteristic that emphasizes the intensity of the sound pressure at a frequency related to abnormal sound of the target equipment P in the non-audible frequency band, from among the Fourier-transformed signals including the audible frequency band and the non-audible frequency band.

Here, the storage medium of the DSP unit 20 stores in advance information regarding the frequency of abnormal sound when the operation sound of the target equipment P includes the abnormal sound, as information regarding the abnormal sound included in the operation sound of the target equipment P. Specifically, the storage medium of the DSP unit 20 stores that the frequency of the abnormal sound of the actual target equipment P straddles a frequency band having a predetermined bandwidth. Furthermore, in the operation sound that includes abnormal sound of the actual target equipment P, the storage medium of the DSP unit 20 stores in advance information on frequency bands included in abnormal sounds and information on frequency bands not included in abnormal sounds among the inaudible frequency bands.

Incidentally, the abnormal sound of the target equipment P occurs when the target equipment P operates in an abnormal state rather than in a normal state. The abnormal sound generated when the target equipment P operates in an abnormal state is likely to include relatively the same frequency band each time the target equipment P changes from a normal state to an abnormal state. Therefore, the information on the frequency bands included in the abnormal sound of the actual target equipment P and the information on the frequency bands not included in the abnormal sound can be obtained from experimental results, etc. in which operation sounds including actual abnormal sounds when the target equipment P is operated in an abnormal state are collected and sound analysis is performed.

In addition, in an experiment to obtain information on the frequency band included in the abnormal sound of the actual target equipment P and information on the frequency band not included in the abnormal sound, the abnormal sound was determined based on predetermined reference information, it may be determined whether the frequency band is an abnormal sound based on predetermined reference information. The reference information is, for example, a predetermined information used to determine whether sound pressure is included in abnormal sound when obtaining the sound pressure intensity obtained by performing Fourier analysis on the operation sound signal of the target equipment P. In this case, Fourier analysis is performed on the operation sound signal that includes the actual abnormal sound when the target equipment P is operated in an abnormal state, and a frequency band having a sound pressure intensity greater than or equal to a predetermined threshold may be adopted as an abnormal sound frequency band.

Based on the frequency band information contained in the abnormal sound, the DSP unit 20 emphasizes the intensity of the sound pressure in the frequency band included in the abnormal sound of the target equipment P in the non-audible frequency band, of the Fourier-transformed signal converted in step S10.

Here, when the abnormal sound of the target equipment P is a sound in the frequency band from 17500 Hz to 19500 Hz in the inaudible frequency band, an example of a method for the DSP unit 20 to emphasize the intensity of sound pressure in a frequency band included in abnormal sound from the target equipment P will be described with reference to FIG. 3. In this case, the storage medium of the DSP unit 20 stores information on a frequency band from 17,500 Hz to 19,500 Hz as information on a frequency band included in the abnormal sound. That is, the storage medium of the DSP unit 20 stores that the frequency of the abnormal sound is from 17,500 Hz to 19,500 Hz.

Further, the storage medium of the DSP unit 20 stores information on frequency bands smaller than 17,500 Hz and information on frequency bands larger than 19,500 Hz as information on frequency bands not included in abnormal sounds. That is, the storage medium of the DSP unit 20 stores information that sounds in the audible frequency band do not include abnormal sounds. Further, the storage medium of the DSP unit 20 stores information that sounds in a frequency band smaller than 17,500 Hz and sounds in a frequency band larger than 19,500 Hz in the inaudible frequency band do not contain abnormal sounds.

The DSP unit 20 having information regarding the frequency band of such abnormal sound performs an increase adjustment on the Fourier-transformed signal transformed in step S10 to increase the strength of the signal in the frequency band from 17,500 Hz to 19,500 Hz by a predetermined increase amount. Further, the DSP unit 20 performs a reduction adjustment to reduce the intensity of the sound pressure in a frequency band smaller than 17,500 Hz and a frequency band larger than 19,500 Hz by a predetermined reduction amount.

Figure 3:
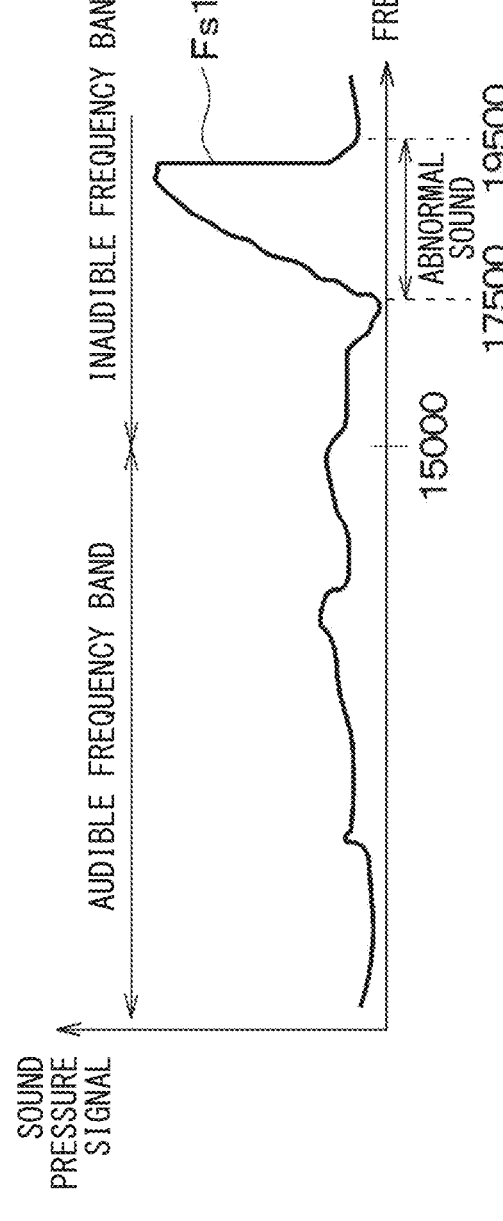
FIG. 3 is a diagram showing an example of frequency characteristics determined by the DSP unit according to the present embodiment.

Thereby, the DSP unit 20 can obtain the frequency characteristic Fs1 shown in FIG. 3, which emphasizes the intensity of the abnormal sound signal, which is the sound pressure signal of the abnormal sound of the target equipment P, for the Fourier-transformed signal converted in step S10. The frequency characteristic Fs1 shown in FIG. 3 shows an example of a sound pressure signal in which the intensity of the abnormal sound signal is emphasized. The frequency characteristic Fs1 in which the intensity of the abnormal sound signal is emphasized in this way is a sound pressure signal corresponding to the Fourier-transformed signal transformed in step S10.

A predetermined amount of increase and a predetermined amount of decrease for emphasizing the intensity of the abnormal sound signal are set in advance in the storage medium of the DSP unit 20 as values that can emphasize the intensity of the abnormal sound signal in the Fourier-transformed signal. The predetermined increase amount and the predetermined decrease amount may be set to have the same absolute value or may be set to different values.

As shown in FIG. 3, in the frequency characteristic Fs1, the sound pressure signals in the frequency band smaller than 17,500 Hz and the frequency band larger than 19,500 Hz have significantly lower sound pressure intensity than the sound pressure signal in the frequency band from 17,500 Hz to 19,500 Hz. In the frequency characteristic Fs1, in the frequency band smaller than 17,500 Hz and the frequency band larger than 19,500 Hz, the sound pressure signal hardly changes even if the frequency changes.

On the other hand, in the frequency band from 17,500 Hz to 19,500 Hz, the ratio of change in sound pressure signal to change in frequency is relatively large. In the frequency band from 17,500 Hz to 19,500 Hz, the shape of the change in the sound pressure signal is mountain-shaped. Specifically, as the frequency value increases from 17500 Hz to the frequency where the magnitude of the sound pressure signal is maximum, the sound pressure signal becomes larger as the frequency becomes larger. Then, from the frequency at which the magnitude of the sound pressure signal is maximum until the frequency value reaches 19500 Hz, the sound pressure signal becomes smaller as the magnitude of the frequency increases.

In this way, in the frequency characteristic Fs1 shown in FIG. 3, the shape indicating the abnormal sound signal is mountain-shaped, but generally, the shape of the sound pressure signal obtained by Fourier transforming abnormal sound generated in production equipment or the like tends to be mountain-shaped. Among the abnormal sound signals shown in the shape of a mountain, the frequency at which the sound pressure signal has the maximum magnitude is the center frequency of the frequency band included in the abnormal sound or the frequency around the center frequency. In the frequency characteristic Fs1 shown in FIG. 3, the sound pressure signal at a frequency of 19,200 Hz, which is higher than the center frequency of 18,500 Hz, is the maximum in the frequency band from 17,500 Hz to 19,500 Hz.

Subsequently, in step S30, the DSP unit 20 shifts the frequency to include at least part of the frequency of the abnormal sound signal in the audible frequency band with respect to the frequency characteristic Fs1 that emphasizes the strength of the abnormal sound signal. Specifically, the DSP unit 20 changes the frequency of the frequency characteristic Fs1 so that at least a part of the frequency of the sound pressure signal whose intensity is emphasized in step S20 is included in the audible frequency band. As a result, at least a part of the abnormal sound signal in the inaudible frequency band is included in the audible frequency band.

By the way, in the human audible frequency band, there is a frequency band to which the human hearing is more sensitive than other frequency bands. Here, the phrase "the sensitivity of human hearing is high" means that even if the intensity of sound pressure is constant, a person can hear a louder sound. In other words, the perceived loudness of sound that a person can hear changes depending on the frequency. The fact that the perceived loudness of a sound that a person can hear changes depending on the frequency will be explained with reference to the equal loudness curves in FIG. 4.

The equal loudness curve represents the magnitude of a sound pressure signal that can be heard at the same loudness as the sound of this loudness value along each frequency based on a sound with a predetermined loudness value of 1000 Hz in the audible frequency band. In the equal loudness curve, when a person tries to listen to a sound with a constant loudness value, the change in frequency and the change in the size of the sound pressure signal will be explained using the case where the loudness value is 20 phon as an example.

Figure 4:
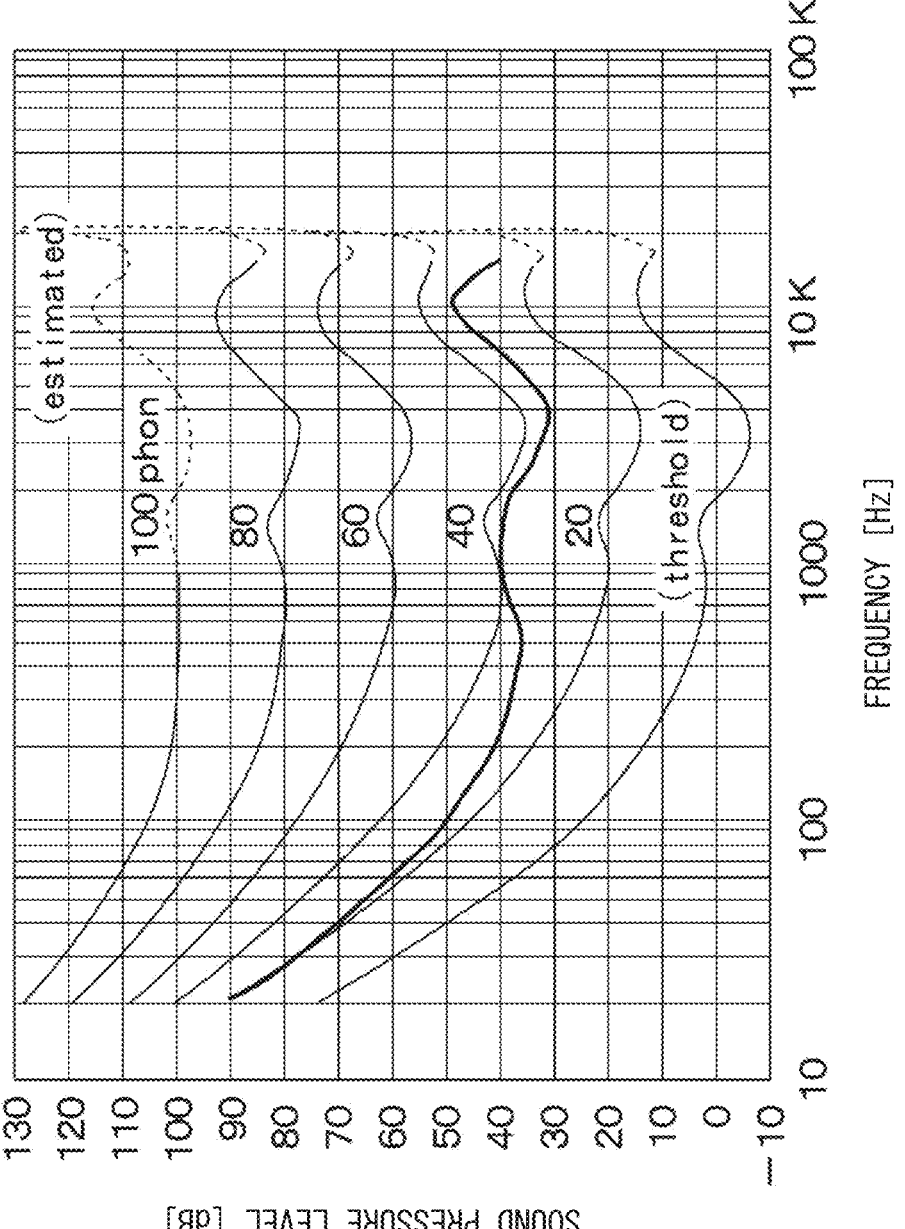
FIG. 4 is a diagram showing equal loudness curves.

When a person listens to the sound level of 20 phon, as shown in FIG. 4, in a frequency band where the sound frequency is smaller than 1000 Hz, the smaller the frequency, the larger the sound pressure signal needs to be larger than 20 dB. Furthermore, when a person listens to the loudness of 20 phon, in a frequency band where the sound frequency is greater than 1000 Hz, the magnitude of the sound pressure signal needs to be greater than 20 dB even in the frequency band from 1000 Hz to approximately 2000 Hz.

However, in a frequency band where the sound frequency is from about 2000 Hz to about 5000 Hz, a person can hear the sound of 20 phon even if the sound pressure signal is smaller than 20 dB. Specifically, in the frequency band from about 2000 Hz to about 5000 Hz, the closer the frequency is to 3500 Hz, which is the center frequency in this frequency band, the smaller the magnitude of the sound pressure signal required for a person to hear the sound of 20 phon.

However, when a person listens to the sound level of 20 phon, the magnitude of the sound pressure signal needs to be greater than 20 dB in a frequency band greater than approximately 5000 Hz.

In this way, in the sound frequency band from about 2000 Hz to about 5000 Hz, a person can listen a sensory sound of 20 phon even if the sound pressure signal is smaller than 20 dB, which is the size of the standard sound pressure signal. Furthermore, in a frequency band where the sound frequency is from about 3000 Hz to about 4000 Hz, the sound pressure signal required for a person to hear the sound of 20 phon can be made smaller. In other words, when the frequency of the sound is between 3000 Hz and 4000 Hz, even if the sound pressure signal is constant, a person can hear the sound as being louder in comparison with the case where the frequency of the sound is at a different frequency from the 3000 Hz to 4000 Hz band.

When a person tries to listen to a sound with a constant value, the change in frequency and the change in the size of the sound pressure signal will be explained using the case where the loudness value is 20 phon as an example. However, as shown in FIG. 4, even if the loudness is a value different from 20 phon, the correspondence between the change in frequency and the change in the magnitude of the sound pressure signal is the same.

For this reason, in the present embodiment, the high-sensitivity band is a frequency band from 3000 Hz to 4000 Hz, which is a frequency band to which the human hearing is more sensitive than other frequency bands, among the human audible frequency bands. Then, the DSP unit 20 in the sound conversion device 1 of the present embodiment changes the frequency of the frequency characteristic Fs1 so that at least a part of the frequency band of the abnormal sound of the target device P is included in the high sensitivity band in the frequency characteristic Fs1 obtained in step S20.

Specifically, the DSP unit 20 first removes the information of the sound pressure signal in the frequency band of 15000 Hz or less including the audible frequency band from the frequency characteristic Fs1 obtained in step S20. Then, the DSP unit 20 changes the frequency of the frequency characteristic Fs1 so that 18,500 Hz, which is the center frequency in the frequency band of abnormal sound from 17,500 Hz to 19,500 Hz, is included in the high sensitivity band.

For example, the DSP unit 20 of the present embodiment subtracts the frequency value of the frequency characteristic Fs1 by 15,000 Hz so that the sound pressure signal from 17,500 Hz to 19,500 Hz, which is the frequency band of abnormal sound, overlaps all bands of the high sensitivity band.

Figures 5, 6:
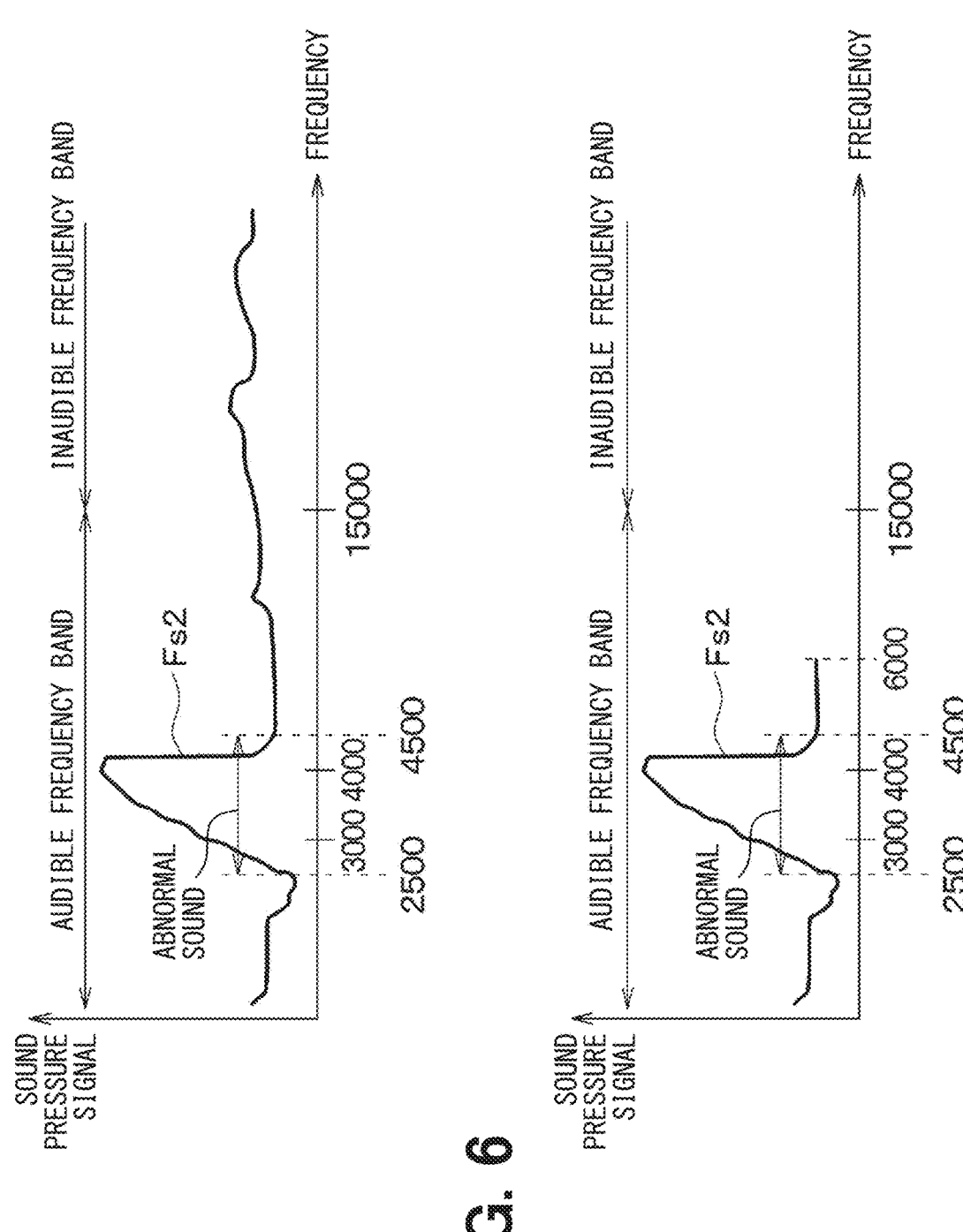
FIG. 5 is a diagram showing an example of frequency characteristics determined by the DSP unit according to the present embodiment.
FIG. 6 is a diagram showing an example in which the DSP unit according to the present embodiment removes a part of the frequency characteristic band.

As a result, the value of the frequency band included in the abnormal sound signal after the frequency has been shifted is a frequency included in the audible frequency band, and is from 2500 Hz to 4500 Hz. As shown in FIG. 5, the frequency of the abnormal sound signal after the frequency has been changed includes all bands from 3000 Hz to 4000 Hz, which is a high sensitivity band, and the sound pressure signal of 18,500 Hz, which is the center frequency of the abnormal sound frequency band, is included in the high sensitivity band. Among the frequencies of the abnormal sound signal after the frequency has been changed, the frequency at which the magnitude of the sound pressure signal becomes maximum is 4200 Hz. Among the frequencies of the abnormal sound signal after the frequency has been changed, the frequency at which the magnitude of the sound pressure signal is maximum is not included in the high sensitivity band.

Hereinafter, the signal obtained by the DSP unit 20 performing a frequency shift on the frequency characteristic Fs1 will also be referred to as an audible signal. The frequency characteristic Fs2 shown in FIG. 5 shows an example of the audible signal.

The lower limit of the high sensitivity band may be set to a frequency smaller than 3000 Hz (for example, 2500 Hz) as long as the frequency band has a higher sensitivity to human hearing than other frequency bands. Further, when the frequency band is a frequency band to which human hearing is more sensitive than other frequency bands, the upper limit value of the high sensitivity band may be set to a frequency higher than 4000 Hz (for example, 4500 Hz).

In this case, the DSP unit 20 can appropriately change the subtraction value for obtaining the audible signal according to the lower limit value of the high sensitivity band and the upper limit value of the high sensitivity band that have been set.

Subsequently, in step S40, the DSP unit 20 performs a low-pass filter processing on the audible signal obtained in step S30. Specifically, the DSP unit 20 removes sound pressure signals in a frequency band higher than a predetermined frequency in a frequency band higher than the high sensitivity band. As shown in FIG. 6, the DSP unit 20 of the present embodiment removes sound pressure signals in a frequency band of 6000 Hz or higher, which is a frequency band higher than 4000 Hz, which is the upper limit of the high sensitivity band, and higher than 4500 Hz, which is the upper limit of the frequency of abnormal sound signals in the audible signal.

The lower limit value in the frequency band removed by the DSP unit 20 may be a frequency (for example, 5000 Hz) smaller than 6000 Hz as long as the frequency is higher than the upper limit value of the frequency of the abnormal sound signal in the audible signal. Further, the lower limit value in the frequency band to be removed by the DSP unit 20 may be a frequency (for example, 7000 Hz) higher than 6000 Hz as long as the frequency is higher than the upper limit value of the frequency of the abnormal sound signal in the audible signal.

Subsequently, in step S50, the DSP unit 20 performs inverse Fourier transform on the audible signal after performing the low-pass filter processing, and converts the audible signal into a signal indicating changes in sound pressure intensity over time. Specifically, the DSP unit 20 extracts only the same predetermined length of time as when the audible signal is subjected to short-time Fourier transform so that the audible signal is converted into an audible sound signal that is a time signal indicating changes in the intensity of sound pressure over time. The DSP unit 20 outputs the converted audible sound signal to the D/A converter 30.

In this way, the DSP unit 20 that executes the processing shown in FIG. 2 functions as a signal conversion circuit by executing the program stored in the storage medium. The DSP unit 20 may include a plurality of circuit modules that correspond one-to-one to each of the processings of steps S10 to S50.

The D/A conversion unit 30 converts the audible signal input from the DSP unit 20 into an analog signal and outputs the analog signal. That is, the D/A conversion unit 30 outputs to the speaker 40 a signal corresponding to the sound pressure signal in a state where the frequency of abnormal sound included in the operation sound of the target equipment P is changed from the inaudible frequency band to the audible frequency band.

Then, the speaker 40 outputs the abnormal sound of the target device P that has been changed from the inaudible frequency band to the audible frequency band based on the signal input from the D/A conversion unit 30. In the present embodiment, the speaker 40 is installed around the target equipment P. Therefore, the sound conversion device 1 can make a person around the target equipment P hear abnormal sounds. For this reason, for example, when a person performs repair work on equipment that is malfunctioning and generates abnormal sounds, the person listens to the abnormal sounds while performing the repair work on the equipment. According to this behavior, it is possible to quickly determine whether or not the repair work has completed the repair of the equipment.

Figure 7:
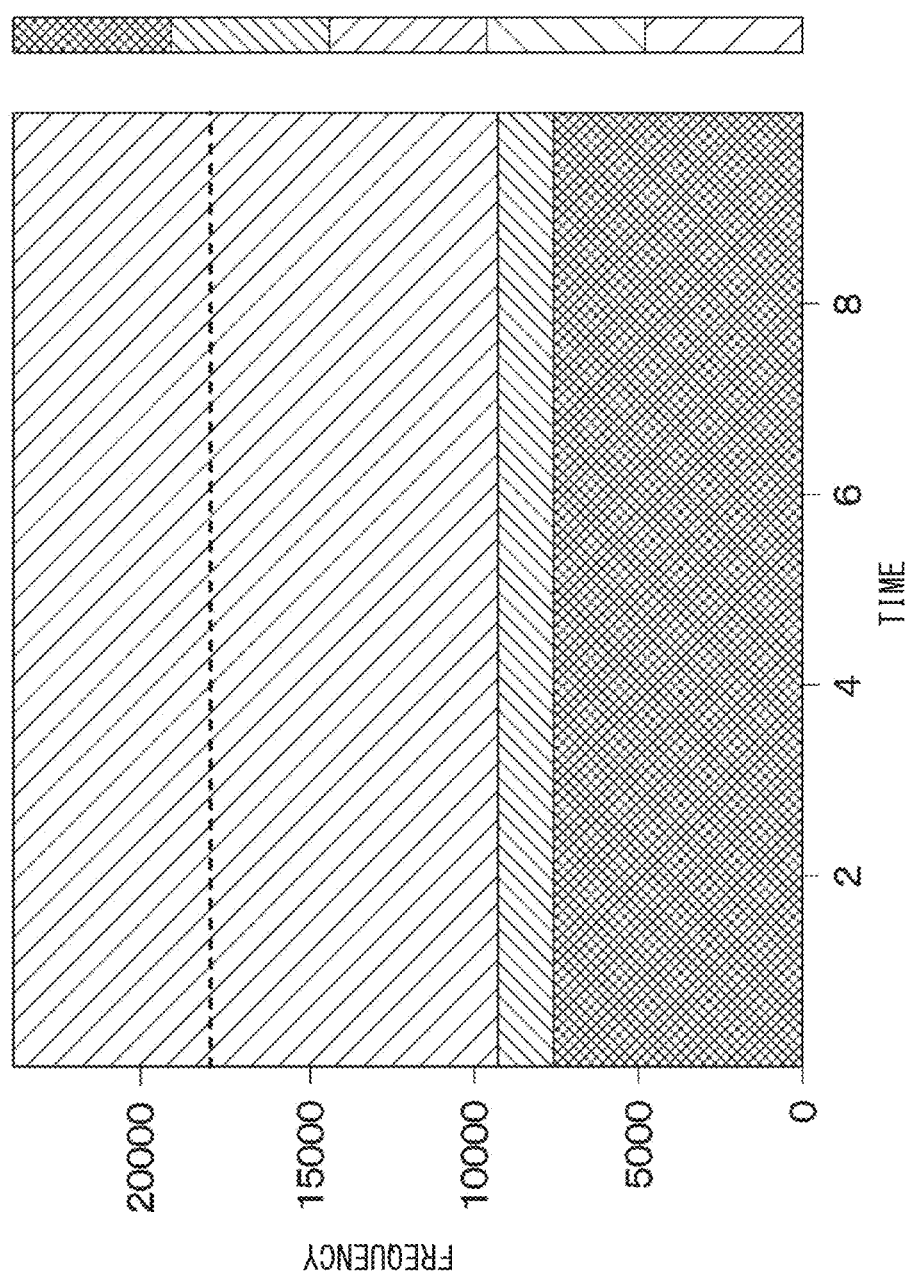
FIG. 7 is a diagram showing a spectrogram of abnormal sound in an inaudible frequency band before changing the frequency.
Figure 8:
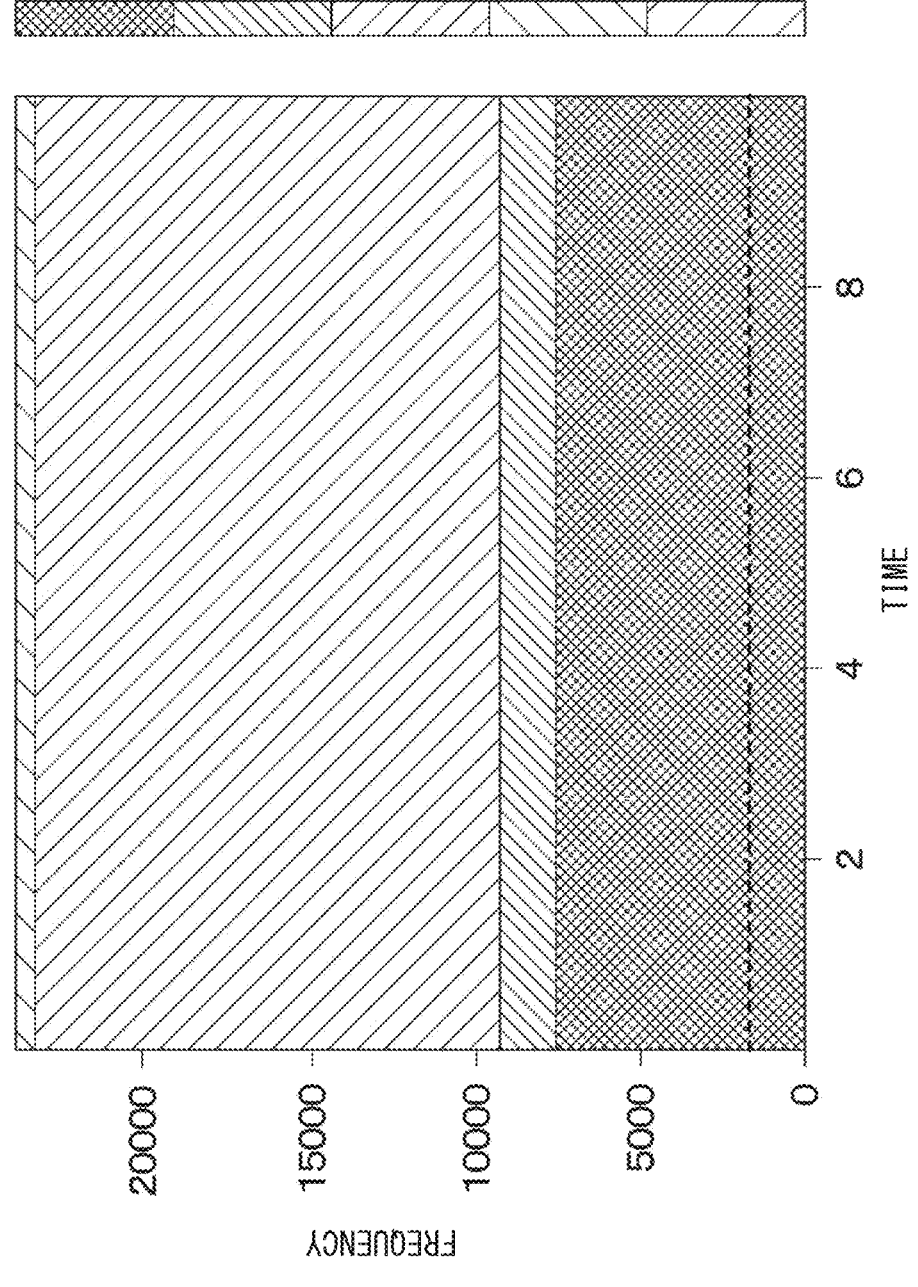
FIG. 8 is a diagram showing a spectrogram of abnormal sound in an inaudible frequency band after changing the frequency.

Here, simulation results of spectrograms when the operation sound of the target equipment P is changed from the inaudible frequency band to the audible frequency band using the sound conversion device 1 of the present embodiment are shown in FIGS. 7 and 8. The operation sound of the target equipment P includes not only the operation sound when operating in a normal state but also the abnormal sound when operating in an abnormal state.

FIG. 7 is a simulation result showing an abnormal sound in an inaudible frequency band before changing the frequency as a spectrogram including a time component, a frequency component, and a sound pressure signal component. FIG. 8 is a simulation result showing an abnormal sound in the audible frequency band after changing the frequency as a spectrogram including a frequency component, a time component, and a sound pressure signal component. In the spectrograms shown in FIGS. 7 and 8, the horizontal axis represents the time component, the vertical axis represents the frequency component, and the density of hatching represents the magnitude of the sound pressure signal. The darker the hatching, the greater the sound pressure signal.

As shown in FIG. 7, the operation sound of the target equipment P before changing the frequency mainly includes the highest sound pressure signal in the band below 8000 Hz, as the operation sound when the target equipment P operates under normal conditions. Further, the band from 8,000 Hz to 10,000 Hz includes sounds with a smaller sound pressure signal than the sounds in the band of 8,000 Hz or less, and the band of 10,000 Hz or more includes sounds with the smallest sound pressure signal. These three sounds having different sound pressure signal magnitudes are sounds generated from the target equipment P when the target equipment P operates in a normal state, and include the audible frequency band and the inaudible frequency band.

The sound in a band of 10,000 Hz or higher when the target equipment P operates in a normal state includes a 17,000 Hz sound in the inaudible frequency band as an abnormal sound when the target equipment P operates in an abnormal state. In the simulation for obtaining the spectrogram shown in FIG. 7, a 17000 Hz sound having a sound pressure signal of a predetermined magnitude was intermittently generated as an abnormal sound when the target equipment P operated in an abnormal state. A broken line shown in FIG. 7 indicates abnormal sound when the target device P operates in an abnormal state.

In addition, as shown in FIG. 8, the operation sound of the target equipment P after changing the frequency includes three sounds whose sound pressure signals differ in magnitude, similar to the spectrogram shown in FIG. 7 as the operation sound when the target equipment P operates under normal conditions. Furthermore, a sound of 2000 Hz is included as an abnormal sound whose frequency has been changed from the inaudible frequency band to the audible frequency band. In this way, by outputting a sound whose frequency has been changed from the inaudible frequency band to the audible frequency band, a person can hear the abnormal sound whose frequency has been changed to the audible frequency band.

As described above, the DSP unit 20 of the sound conversion device 1 converts the sound pressure time signal into frequency characteristics, changes the frequency of the abnormal sound signal in the inaudible frequency band to the frequency in the audible frequency band, and obtains the audible signal. Then, the obtained audible signal is output to the D/A conversion unit 30 as an audible sound signal. Then, the speaker 40 outputs the abnormal sound of the target device P that has been changed from the inaudible frequency band to the audible frequency band based on the signal input from the D/A conversion unit 30.

According to this configuration, even if the operation sound of the target equipment P includes an abnormal sound with a frequency in the human inaudible frequency band, by converting the frequency of the abnormal sound into a human audible frequency band and generating it, it can be heard by a person.

According to the embodiment described above, it is possible to achieve the following advantageous effects.

(1) In the above embodiment, the DSP unit 20 obtains an audible signal such that at least a part of the abnormal sound signal is included in a high sensitivity band in which the human hearing is more sensitive than other frequency bands in the human audible frequency band.

The reason for obtaining the audible signal in this way is that, as described above, even if the magnitude of the sound pressure signal of the sound is constant, the sensitivity of human hearing varies depending on the frequency of the sound. Therefore, according to the present embodiment, by changing the frequency band of the abnormal sound so that it is included in the high sensitivity band where human hearing is more sensitive than other frequency bands in the human audible frequency band, people is more likely to hear the abnormal sound.

(2) In the above embodiment, the DSP unit 20 obtains the audible signal such that the center frequency in the frequency band of the abnormal sound signal is included in the high sensitivity band.

The reason for obtaining the audible signal in this way is that, as described above, in the frequency band included in the abnormal sound, the sound pressure signal at the center and around the center of the frequency band tends to be large. Therefore, according to the present embodiment, a frequency band in which the sound pressure signal of an abnormal sound signal tends to become high can be included in the high sensitivity band, so that it is possible to make it easier for people to hear the abnormal sound.

(3) In the above embodiment, the DSP unit 20 removes the sound pressure signal in the band of 6000 Hz or higher, which is a predetermined frequency in a frequency band higher than the high sensitivity band.

According to this configuration, the sound pressure signal of the abnormal sound included in the frequency band smaller than 6000 Hz is emphasized, so that it is possible to make it easier for people to hear the abnormal sound.

(4) In the above embodiment, the DSP unit 20 obtains a frequency characteristic in which the intensity of the abnormal sound signal is emphasized, and obtains an audible signal based on the frequency characteristic in which the intensity of the abnormal sound signal is emphasized.

According to this configuration, since the audible signal is generated based on the frequency characteristic in which the sound pressure signal of the abnormal sound is emphasized, it is possible to make the abnormal sound easier for people to hear.

(5) In the above embodiment, the DSP unit 20 performs an increase adjustment to increase the intensity of the sound pressure at a frequency included in the abnormal sound signal, and performs a decrease adjustment to decrease the intensity of the sound pressure at a frequency different from the frequency included in the abnormal sound signal, and the DSP unit 20 emphasizes the intensity of the abnormal sound signal.

According to this configuration, compared to performing high-pass filter processing that only passes sounds above a specified frequency, since the abnormal sound signal is more emphasized in the frequency characteristics, the abnormal sound can be made easier to hear for people.

OTHER EMBODIMENTS

Although representative embodiments of the present disclosure have been described above, the present disclosure is not limited to the embodiments described above, and various modifications can be made, for example, as follows.

In the above described embodiment, the DSP unit 20 emphasizes the intensity of the sound pressure in the frequency band related to abnormal sound and obtains frequency characteristics with respect to the Fourier transformed signal obtained by performing Fourier transform processing on the sound pressure time signal. However, it is not limited to this configuration.

For example, the DSP unit 20 may obtain the frequency characteristics by performing Fourier transform processing on a signal that emphasizes the intensity of sound pressure in a frequency band related to abnormal sound in the sound pressure time signal using well-known signal processing software. That is, the DSP unit 20 may execute the processing corresponding to step S10 after executing the processing corresponding to step S20 in the processing shown in FIG. 2. In this case, the signal obtained by executing the processing corresponding to step S20 in the processing shown in FIG. 2 is a sound pressure signal corresponding to the sound pressure time signal.

In the above-described embodiment, an example has been described in which the DSP unit 20 changes the frequency band of the abnormal sound signal to a frequency band smaller than before the change and obtains the audible signal, but the present disclosure is not limited to this configuration. For example, when the frequency of the abnormal sound is a frequency lower than the audible frequency band, the DSP unit 20 may change the frequency band of the abnormal sound signal to a higher frequency than before the change and obtain the audible signal.

In the above-described embodiment, an example has been described in which the speaker 40, which is a sound generating portion, is installed around the target equipment P, but the present disclosure is not limited thereto. For example, the speaker 40 may be installed separated from the target equipment P. Specifically, the speaker 40 is installed in a portable or wearable electronic device carried by a worker, and may be included in, for example, a mobile phone, a tablet terminal, a smart watch, or the like.

According to this configuration, the sound conversion device 1 can make a person who is not around the target equipment P hear the abnormal sound. Therefore, people can hear abnormal sounds even when people is far away from the equipment.

In the above-described embodiment, the example has been described in which the DSP unit 20 obtains the audible signal such that at least a part of the frequency of the abnormal sound signal in the frequency characteristic is included in the high sensitivity band, but the present disclosure is not limited to this configuration. For example, the DSP unit 20 may obtain the audible signal such that all frequencies of the abnormal sound signal in the frequency characteristic are included in a frequency band different from the high sensitivity band in the audible frequency band.

Figure 9:
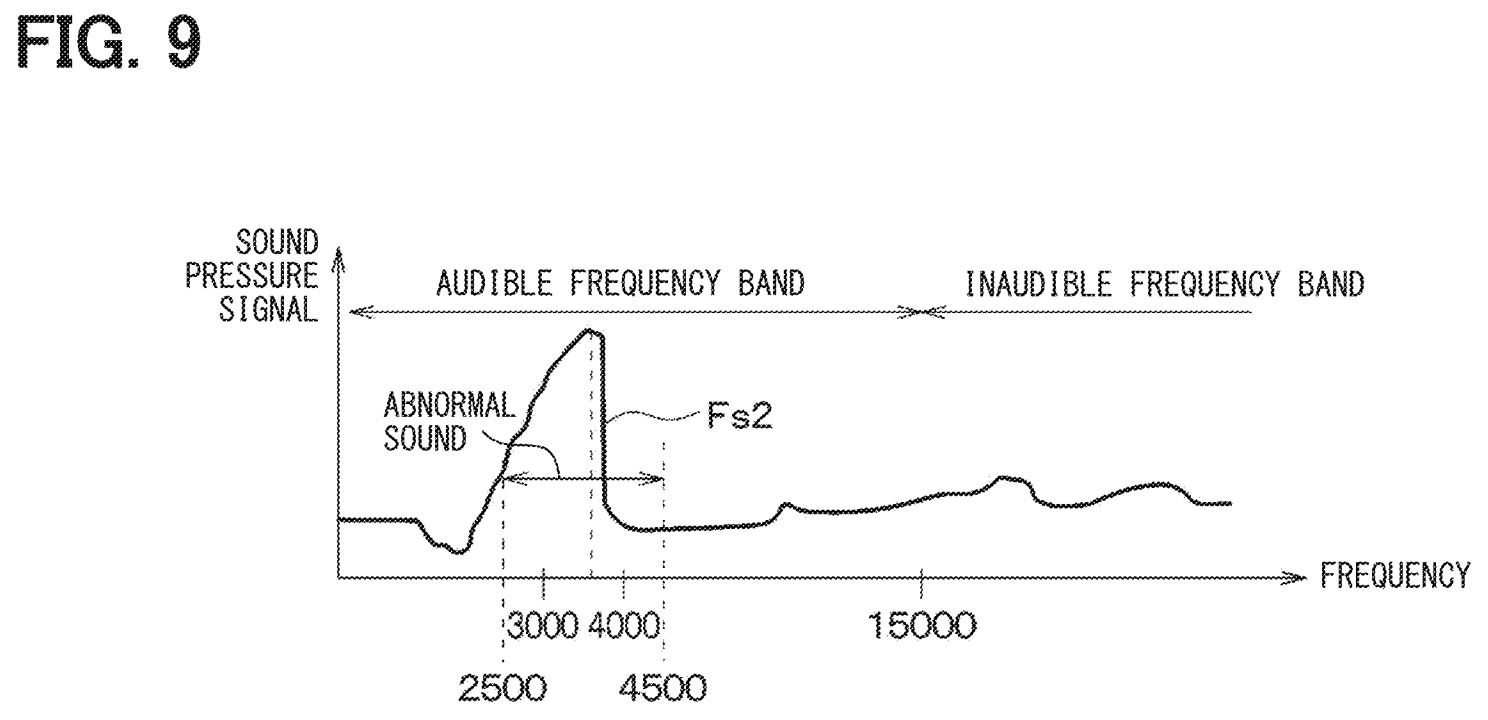

In the above-described embodiment, the example has been described in which the DSP unit 20 obtains the audible signal such that the center frequency in the frequency band of the abnormal sound signal is included in the high sensitivity band, but the present disclosure is not limited to this configuration. For example, as shown in FIG. 9, the DSP unit 20 may obtain the audible signal such that the frequency at which the sound pressure signal is largest in the frequency band of the abnormal sound signal is included in the high sensitivity band.

According to this configuration, the frequency with the largest sound pressure signal in the frequency band of the abnormal sound is included in the high sensitivity band, so that it is possible to make it easier for people to hear the abnormal sound.

In the above-described embodiment, the example has been described in which the DSP unit 20 shifts the frequency with respect to the frequency characteristic Fs1 so that the center frequency in the frequency band of the abnormal sound signal is included in the high sensitivity band, but the present disclosure is not limited to this configuration. For example, the DSP unit 20 changes only the sound pressure signal with the center frequency in the frequency band of the abnormal sound signal to the high sensitivity band so that the center frequency in the frequency band of the abnormal sound signal is included in the high sensitivity band.

In the above-described embodiment, the example has been described in which the DSP unit 20 removes sound pressure signals in a band of 6000 Hz or higher, which is a predetermined frequency in a frequency band higher than the high sensitivity band, but the present disclosure is not limited to this configuration. For example, the DSP unit 20 may be configured not to remove sound pressure signals in a frequency band higher than a predetermined frequency in a frequency band higher than the high sensitivity band. That is, the DSP unit 20 may perform the processing shown in FIG. 2 in which the processing in step S40 is omitted.

In the above-described embodiment, the example has been described in which the DSP unit 20 obtains a frequency characteristic in which the intensity of the abnormal sound signal is emphasized, and obtains an audible signal based on the frequency characteristic in which the intensity of the abnormal sound signal is emphasized, but the present disclosure is not limited to this configuration. For example, the DSP unit 20 may obtain the audible signal based on a frequency characteristic in which the intensity of the abnormal sound signal is not emphasized. That is, the DSP unit 20 may perform the processing shown in FIG. 2 in which the processing in step S20 is omitted.

In the above embodiment, the DSP unit 20 performs an increase adjustment to increase the intensity of the sound pressure at a frequency included in the abnormal sound signal, and performs a decrease adjustment to decrease the intensity of the sound pressure at a frequency different from the frequency included in the abnormal sound signal, and the DSP unit 20 emphasizes the intensity of the abnormal sound signal. However, the processing of the DSP unit 20 is not limited to this processing.

For example, the DSP unit 20 may perform only one of the increase adjustment and the decrease adjustment to emphasize the intensity of the abnormal sound signal.

In the embodiments described above, it is needless to say that the elements configuring the embodiments are not necessarily essential except in the case where those elements are clearly indicated to be essential in particular, the case where those elements are considered to be obviously essential in principle, and the like.

In the embodiments described above, the present disclosure is not limited to the specific number of components of the embodiments, except when numerical values such as the number, numerical values, quantities, ranges, and the like are referred to, particularly when it is expressly indispensable, and when it is obviously limited to the specific number in principle, and the like.

In the embodiments described above, when referring to the shape, positional relationship, and the like of a component and the like, it is not limited to the shape, positional relationship, and the like, except for the case where it is specifically specified, the case where it is fundamentally limited to a specific shape, positional relationship, and the like, and the like.

What is claimed is:

1. A sound conversion device for converting an operation sound generated when a target equipment operates, comprising:

a sound acquisition circuit configured to acquire the operation sound including abnormal sound as a sound pressure time signal that is a signal indicating a change in sound pressure intensity over time;

a signal conversion circuit configured to convert a signal corresponding to the sound pressure time signal into a frequency characteristic indicating an intensity of sound pressure for each frequency including a human inaudible frequency band, obtain audible signal in which the frequency of an abnormal sound signal indicating the intensity of the sound pressure of the abnormal sound in the inaudible frequency band is changed to a human audible frequency band in the signal corresponding to the frequency characteristic, and output the audible signal as an audible sound signal that is a signal indicating a change in sound pressure intensity over time; and a speaker configured to generate sound based on the audible sound signal, wherein when the frequency of the abnormal sound signal straddles a frequency band having a predetermined bandwidth, the signal conversion circuit obtains the audible signal such that at least a part of the frequency of the abnormal sound signal is included in a high sensitivity band, which is a frequency band to which human hearing is more sensitive compared to other frequencies in the human audible frequency band, and removes a sound pressure signal in a frequency band higher than a predetermined frequency in a frequency band higher than the high sensitivity band in the audible signal.

2. The sound conversion device according to claim 1, wherein the signal conversion circuit obtains the audible signal such that a center frequency in a frequency band of the abnormal sound signal is included in the high sensitivity band.

3. The sound conversion device according to claim 1, wherein the signal conversion circuit obtains the audible signal such that a frequency with the highest sound pressure signal in the frequency band of the abnormal sound signal is included in the high sensitivity band.

4. The sound conversion device according to claim 1, wherein the signal conversion circuit obtains the frequency characteristic in which an intensity of the abnormal sound signal is emphasized, and obtains the audible signal based on the frequency characteristic in which an intensity of the abnormal sound signal is emphasized.

5. The sound conversion device according to claim 4, wherein in an increase adjustment to increase the intensity of sound pressure at a frequency included in the abnormal sound signal and a decrease adjustment to decrease the intensity of sound pressure at a frequency different from the frequency included in the abnormal sound signal, the signal conversion circuit performs at least one of the increase and the decrease adjustments and emphasizes the intensity of the abnormal sound signal.

6. A sound conversion device for converting an operation sound generated when a target equipment operates, comprising:

a sound acquisition circuit configured to acquire the operation sound including abnormal sound as a sound pressure time signal that is a signal indicating a change in sound pressure intensity over time;

a signal conversion circuit configured to convert a signal corresponding to the sound pressure time signal into a frequency characteristic indicating an intensity of sound pressure for each frequency including a human inaudible frequency band, obtain audible signal in which the frequency of an abnormal sound signal indicating the intensity of the sound pressure of the abnormal sound in the inaudible frequency band is changed to a human audible frequency band in the signal corresponding to the frequency characteristic, and output the audible signal as an audible sound signal that is a signal indicating a change in sound pressure intensity over time; and a speaker configured to generate sound based on the audible sound signal, wherein in an increase adjustment to increase the intensity of sound pressure at a frequency included in the abnormal sound signal and a decrease adjustment to decrease the intensity of sound pressure at a frequency different from the frequency included in the abnormal sound signal, the signal conversion circuit performs at least the increase adjustment to emphasize the intensity of the abnormal sound signal to obtain the frequency characteristic, and obtains the audible signal based on the frequency characteristic in which the intensity of the abnormal sound signal is emphasized.

7. The sound conversion device according to claim 6, wherein the signal conversion circuit obtains the audible signal such that at least a part of the frequency of the abnormal sound signal is included in a high sensitivity band, which is a frequency band to which human hearing is more sensitive than other frequencies in the human audible frequency band, when the frequency of the abnormal sound signal straddles a frequency band having a predetermined bandwidth.

8. The sound conversion device according to claim 7, wherein the signal conversion circuit obtains the audible signal such that a center frequency in a frequency band of the abnormal sound signal is included in the high sensitivity band.

9. The sound conversion device according to claim 7, wherein the signal conversion circuit obtains the audible signal such that a frequency with the highest sound pressure signal in the frequency band of the abnormal sound signal is included in the high sensitivity band.

10. A sound conversion device for converting an operation sound generated when a target equipment operates, comprising:

a computer including a processor and a memory that stores instructions configured to, when executed by the processor, cause the processor to acquire the operation sound including abnormal sound as a sound pressure time signal that is a signal indicating a change in sound pressure intensity over time;

convert a signal corresponding to the sound pressure time signal into a frequency characteristic indicating an intensity of sound pressure for each frequency including a human inaudible frequency band, obtain audible signal in which the frequency of an abnormal sound signal indicating the intensity of the sound pressure of the abnormal sound in the inaudible frequency band is changed to a human audible frequency band in the signal corresponding to the frequency characteristic, and output the audible signal as an audible sound signal that is a signal indicating a change in sound pressure intensity over time; and a speaker configured to generate sound based on the audible sound signal, wherein when the frequency of the abnormal sound signal straddles a frequency band having a predetermined bandwidth, the computer causes the processor to obtain the audible signal such that at least a part of the frequency of the abnormal sound signal is included in a high sensitivity band, which is a frequency band to which human hearing is more sensitive compared to other frequencies in the human audible frequency band, and remove a sound pressure signal in a frequency band higher than a predetermined frequency in a frequency band higher than the high sensitivity band in the audible signal.

11. The sound conversion device according to claim 10, wherein the computer causes the processor to obtain the audible signal such that a center frequency in a frequency band of the abnormal sound signal is included in the high sensitivity band.

12. The sound conversion device according to claim 10, wherein the computer causes the processor to obtain the audible signal such that a frequency with the highest sound pressure signal in the frequency band of the abnormal sound signal is included in the high sensitivity band.

13. The sound conversion device according to claim 10, wherein the computer causes the processor to obtain the frequency characteristic in which an intensity of the abnormal sound signal is emphasized, and obtains the audible signal based on the frequency characteristic in which an intensity of the abnormal sound signal is emphasized.

14. The sound conversion device according to claim 13, wherein in an increase adjustment to increase the intensity of sound pressure at a frequency included in the abnormal sound signal and a decrease adjustment to decrease the intensity of sound pressure at a frequency different from the frequency included in the abnormal sound signal, the computer causes the processor to perform at least one of the increase and the decrease adjustments and emphasizes the intensity of the abnormal sound signal.

* * * * *